United States Patent
Schelling et al.

(10) Patent No.: US 8,925,299 B2
(45) Date of Patent: Jan. 6, 2015

(54) ARRANGEMENT AND METHOD FOR OPERATING AN EXHAUST GAS POST-TREATMENT DEVICE

(75) Inventors: Bernd Schelling, Stuttgart (DE); Patrick Bauer, Stuttgart (DE); Mehmet Oencel, Boennigheim (DE); Ralph Bauer, Esslingen (DE); Thomas Holst, Stuttgart (DE); Georg Hoegele, Muenchingen (DE)

(73) Assignee: Robert Bosch GmbH, Stuttgart (DE)

( * ) Notice: Subject to any disclaimer, the term of this patent is extended or adjusted under 35 U.S.C. 154(b) by 165 days.

(21) Appl. No.: 13/391,797

(22) PCT Filed: Sep. 8, 2010

(86) PCT No.: PCT/EP2010/063180
§ 371 (c)(1),
(2), (4) Date: Feb. 22, 2012

(87) PCT Pub. No.: WO2011/032871
PCT Pub. Date: Mar. 24, 2011

(65) Prior Publication Data
US 2012/0144805 A1    Jun. 14, 2012

(30) Foreign Application Priority Data
Sep. 16, 2009    (DE) .......................... 10 2009 029 517

(51) Int. Cl.
| | | |
|---|---|---|
| *F01N 3/00* | (2006.01) | |
| *F01N 11/00* | (2006.01) | |
| *F01N 9/00* | (2006.01) | |
| *F02D 41/02* | (2006.01) | |
| *F02D 41/22* | (2006.01) | |

(52) U.S. Cl.
CPC ...... *F01N 11/00* (2013.01); *F01N 9/00* (2013.01); *F02D 41/0235* (2013.01); *F02D 41/221* (2013.01); *F01N 2240/16* (2013.01); *F01N 2390/02* (2013.01); *F01N 2250/05* (2013.01); *F01N 2550/22* (2013.01); *F01N 2610/14* (2013.01); *F02D 41/029* (2013.01); *F02D 2041/227* (2013.01); *Y02T 10/47* (2013.01)
USPC .............. 60/277; 60/274; 60/285; 60/286; 701/103; 701/109; 701/29.2

(58) Field of Classification Search
USPC .......... 60/274, 276, 277, 285, 286, 297, 303; 701/103, 107, 29.1, 29.2
See application file for complete search history.

(56) References Cited

U.S. PATENT DOCUMENTS 5,438,827 A * 8/1995 Ohuchi et al. .................. 60/276
5,848,530 A * 12/1998 Matsuoka et al. .............. 60/277
(Continued)

OTHER PUBLICATIONS

PCT/EP2010/063180 International Search Report.

*Primary Examiner* — Binh Q Tran
(74) *Attorney, Agent, or Firm* — Michael Best & Friedrich LLP

(57) ABSTRACT

The invention relates to an arrangement (1) for operating an exhaust gas post-treatment device, particularly of a motor vehicle, wherein the arrangement (1) comprises a plurality of consumers (3-12) and a controller (2), wherein the controller (2) comprises at least one switching device (13) for switching the consumers (3-12) on and off. According to the invention, the consumers (3-12) are grouped according to function, and connected to one switch (17-21) each of the switching device (13). The invention further relates to a method for operating an exhaust post-treatment device.

14 Claims, 2 Drawing Sheets

(56) References Cited

U.S. PATENT DOCUMENTS

| | | | |
|---|---|---|---|
| 5,857,325 A * | 1/1999 | Shimasaki et al. | 60/284 |
| 5,936,314 A * | 8/1999 | Suganuma et al. | 307/10.1 |
| 6,367,246 B1 | 4/2002 | Hirota et al. | |
| 6,622,081 B2 * | 9/2003 | Wada | 701/114 |
| 6,945,035 B2 * | 9/2005 | Hirooka et al. | 60/289 |
| 7,366,942 B2 * | 4/2008 | Lee | 713/500 |
| 7,549,284 B2 * | 6/2009 | Iihoshi et al. | 60/285 |
| 7,614,218 B2 * | 11/2009 | Akagawa | 60/295 |
| 7,665,295 B2 | 2/2010 | Pfaeffle et al. | |
| 8,165,739 B2 * | 4/2012 | Matsumoto | 701/22 |
| 8,384,397 B2 * | 2/2013 | Bromberg et al. | 324/636 |
| 2005/0207936 A1 | 9/2005 | Berryhill et al. | |
| 2007/0251226 A1 | 11/2007 | Kaneko | |
| 2008/0282677 A1 | 11/2008 | Gonze et al. | |

\* cited by examiner

|    | 22  | 23 | 24 | 25  | 26  |
|----|-----|----|----|-----|-----|
| 22 | ✗   | ✓  | ✗  | (✓) | (✓) |
| 23 | ✓   | ✗  | ✓  | ✓   | ✓   |
| 24 | O   | ✓  | ✗  | ✓   | ✓   |
| 25 | O   | ✓  | ✓  | ✗   | ✓   |
| 26 | O   | ✓  | ✓  | ✓   | ✗   |

Fig. 2

ARRANGEMENT AND METHOD FOR OPERATING AN EXHAUST GAS POST-TREATMENT DEVICE

BACKGROUND OF THE INVENTION

The invention relates to an arrangement for operating an exhaust gas post-treatment device, in particular of a motor vehicle, wherein the device comprises a plurality of consumers and a control module, wherein the control module comprises at least one switching unit for switching the consumers on and off.

The invention further relates to a method for operating an exhaust gas post-treatment device, in particular of a motor vehicle, wherein a plurality of consumers of the exhaust gas post-treatment device are connected to at least one switching unit of a control module.

Arrangements and methods of the aforesaid type are known in the state of the art. Modern exhaust gas post-treatment devices for post-treatment of the exhaust gas from internal combustion engines generally comprise a plurality of consumers, which must be supplied with electrical power. Such consumers are switchable valves, for example, or also feed units for feeding exhaust gas post-treatment agent, which is to be admixed with the exhaust gas. Here a plurality of consumers are usually connected to one switch of the switching unit, so that by operating one switch a plurality of consumers can be switched on and/or off simultaneously. If the consumers are deactivated by operation of the switch, however, because one of the consumers is showing a malfunction, for example, the other consumers still functional or functioning properly are also deactivated. The operation of the post-treatment device is thereby detrimentally and needlessly restricted.

SUMMARY OF THE INVENTION

According to the invention the consumers, grouped according to their function, are in each case connected to one switch of the switching unit. The consumers are therefore grouped in a specific way and in each case connected to one switch, this grouping taking account of the function of the consumers. The consumers which operate in concert in order to fulfill a specific function of the exhaust gas post-treatment device, for example, are thereby combined or grouped in one group, the respective group in each case being connected to one switch of the switching unit. Here the term functional grouping therefore does not imply the grouping of consumers of non-exclusively identical design, but in particular also consumers which are of different design and/or which perform different sub-functions, which together, however, fulfill a specific function. Thus consumers, which preferably serve the same purpose and together therefore fulfill one function, may be provided at various points of the exhaust gas post-treatment device and perform different functions.

The switches are advantageously embodied as high-side switches. This means that the switches switch the positive operating voltage of the consumers. In operation, the actual switching of the consumers is preferably performed via low-side switches. The low-side switches therefore serve for operational switching of the consumers in order to fulfill their function, whilst the high-side switches preferably serve as fuse switches. By in each case connecting a plurality of consumers, grouped according to their function, to one switch, a so-called bank concept is created. The switching unit is advantageously designed in such a way that the power loss is uniformly spread between all high-side switches or banks.

The arrangement suitably comprises a diagnostic circuit for detecting a malfunction in the exhaust gas post-treatment device, in particular for detecting a malfunction in the consumers. The diagnostic circuit is more preferably connected to corresponding sensors, which are assigned to the consumers and which serve for functional monitoring.

Furthermore the diagnostic circuit is operatively connected to the switching unit, in such a way that by operating the corresponding switch it deactivates the group comprising the consumer, to which a detected malfunction is attributable. In this way the corresponding group and the corresponding consumer is protected from destruction.

According to an advantageous development a first group comprises at least one consumer for building up pressure for an exhaust gas post-treatment agent. Such a consumer is suitably a feed or pump unit, which feeds liquid exhaust gas post-treatment agent from an exhaust gas post-treatment agent tank to an injection valve arranged in an exhaust pipe. In so doing the feed unit ensures a build-up of pressure, which allows an injection of the exhaust gas post-treatment agent under high pressure and hence an efficient mixing of the exhaust gas post-treatment agent with the exhaust gas.

As consumer, a second group preferably comprises at least one actuator for operating the injection valve for the exhaust gas post-treatment agent. This actuator is, for example, a solenoid actuator for displacing a valve needle of the injection valve. Subdividing the actuator for operating the injection valve and the consumer for building up the pressure for the exhaust gas post-treatment agent into different groups makes it possible, for example, should the first group fail, to utilize the residual pressure still present in the exhaust gas post-treatment agent feed system, relying upon the actuator of the second group to operate the injection valve, and to perform exhaust gas post-treatment agent injection sequences until the pressure has been entirely exhausted, for example.

As consumer, a third group furthermore comprises an actuator for a valve for controlling particle filter regeneration. This valve is preferably a so-called HCI valve. It is equally feasible for this valve to take the form of a bypass valve which, for example, conducts hot exhaust gas needed for the particle filter regeneration past an element, which is situated in the exhaust tract and extracts heat from the exhaust gas, so that the high-temperature exhaust gas is used for regeneration of the particle filter. Said element may be the turbine of an exhaust turbocharger, for example, or also a catalytic converter connected to the inlet side of the particle filter.

As consumer, a fourth group of consumers comprises at least one primary heating unit. The primary heating unit is preferably a heating unit which is assigned to a catalytic converter and/or a particle filter of the exhaust gas post-treatment device and which directly heats the catalytic converter or the particle filter, in order to bring these to their respective activation temperature.

Finally a fifth group comprises at least one secondary heating unit as consumer. The secondary heating unit is suitably a heating unit, which is assigned to the exhaust gas post-treatment agent feed system and which serves, in particular, for keeping the temperature of the exhaust gas post-treatment agent above its freezing point, so that even at low ambient temperatures the feeding of exhaust gas post-treatment agent is reliably ensured. Like the primary heating unit, the secondary heating unit may also comprise a plurality of heating elements, which are assigned to various points of the exhaust gas post-treatment device. In the event of a malfunction, the advantageous grouping therefore allows the secondary heating elements to be deactivated independently of the primary hearing elements.

The consumer grouping described allows at least partial use of the exhaust gas post-treatment device despite the malfunction of a consumer. This means, for example, that the motor vehicle does not have to be brought into the service workshop immediately once a malfunction occurs. Instead, by at least partially maintaining the function of the exhaust gas post-treatment device, the motor vehicle can continue to be operated at least to a certain extent. Thus particle filter regeneration, for example, can be performed even if the consumer(s) for building up pressure for the exhaust gas post-treatment agent, that is to say the first group of consumers, is/are deactivated. Naturally other functional groupings of consumers are also feasible. Thus in a further embodiment the first group and second group of consumers together advantageously form a group of consumers which generally relate to the exhaust gas post-treatment agent feed system.

The distinguishing feature of the inventive method is that the consumers, grouped according to their function, are in each case connected to one switch of the switching unit. In particular, the consumers are grouped according to the arrangement described above. This affords the advantages specified above. If a malfunction of one of the consumers is detected, the group comprising the consumer having the malfunction is deactivated through operation of the corresponding switch, further operation of the remainder of the exhaust gas post-treatment device being possible due to the functional grouping of the consumers.

BRIEF DESCRIPTION OF THE DRAWINGS

The invention will be explained in more detail below with reference to an exemplary embodiment. In the drawing:

FIG. 1 shows a schematic representation of an advantageous arrangement for operating an exhaust gas post-treatment device and FIG. 2 shows an availability matrix explaining the advantageous arrangement.

DETAILED DESCRIPTION

Figure 1:
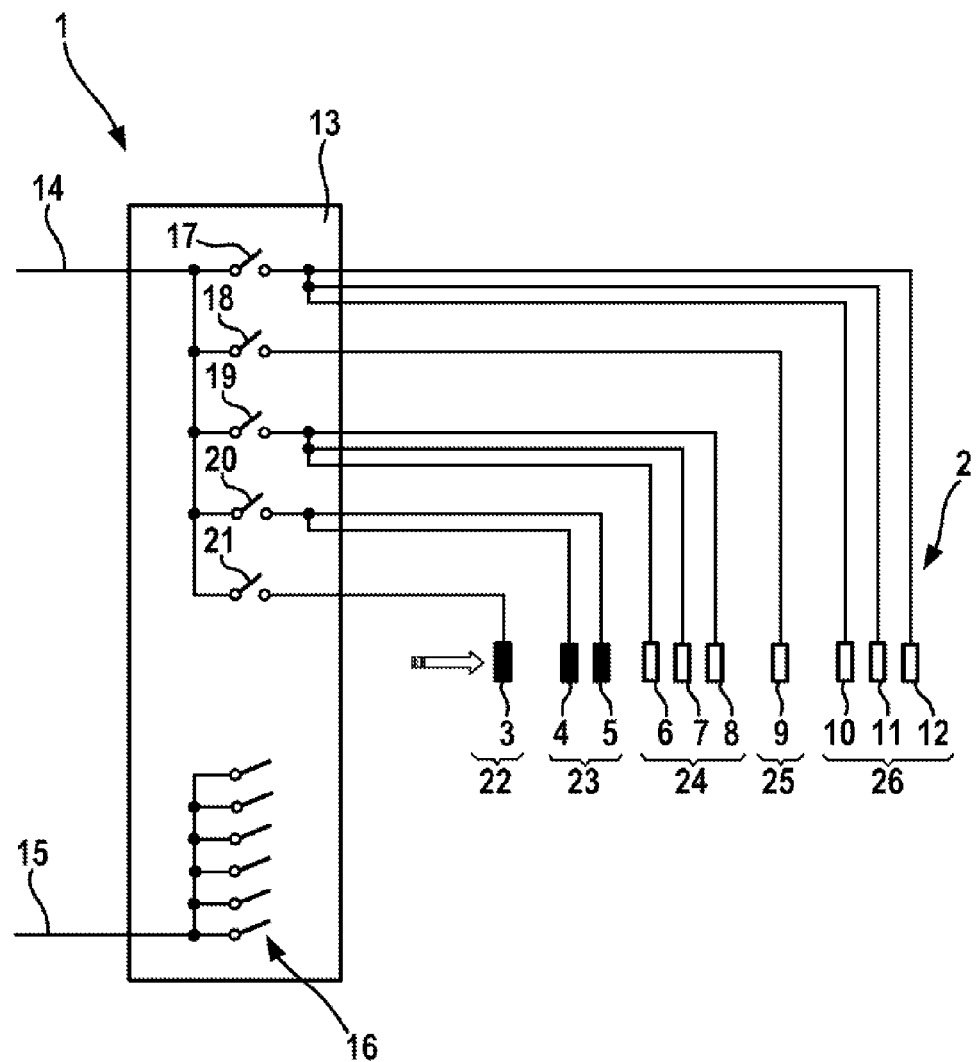

FIG. 1, in a highly schematic representation, shows an advantageous arrangement 1 for operating an exhaust gas post-treatment device (not shown in more detail here) of an internal combustion engine. The exhaust gas post-treatment device comprises a plurality of consumers 3 to 12, which are connected to a switching unit 13 of a control module 2 of the arrangement 1 for switching the consumers 3 to 12 on and off. The switching unit 13 comprises a first terminal for a positive supply voltage 14 and a second terminal for negative supply voltage 15 of a supply voltage source, not represented in further detail here. The switching unit 13 comprises a plurality of switches 16 assigned to the negative supply voltage 15, which form low-side switches, and a plurality of switches 17 to 21 assigned to positive supply voltage 14, which form high-side switches of the switching unit 13.

The consumers 3 to 12, advantageously grouped according to their function, are in each case connected to one of the switches 17 to 21. The consumer 3, which is preferably an actuator of an injection valve for exhaust gas post-treatment agent, forms a first group 22. A second group 23 is formed by the consumers 4 and 5, which are advantageously actuators for operating valves for performing particle filter regeneration. Thus one of the valves, for example, may be a so-called HCI valve and the other valve a bypass valve, which through corresponding switching allow a regeneration of a particle filter of the exhaust gas post-treatment device.

A further group 24 comprises the consumers 6, 7 and 8, which are intended for building up pressure for the exhaust gas post-treatment agent. Thus at least one of the consumers 6 to 8, for example, is a pump or feed unit for the exhaust gas post-treatment agent. The other remaining consumers of this group 24 may be switchable valves, which are needed for building up pressure.

A further group 25 comprises the consumer 9, which is a primary heating unit. This is directly assigned to an exhaust gas post-treatment unit, such as a catalytic converter or particle filter, for example, in order to boost their temperature in such a way that the exhaust gas post-treatment unit reaches its activation temperature.

The remaining consumers 10 to 12 are combined in a group 26. These consumers are secondary heating units, which are assigned, for example, to the exhaust gas post-treatment agent feed system or also to the exhaust pipe, in order to prevent freezing of the exhaust gas post-treatment agent, or in order to heat up the exhaust gas flowing through the exhaust pipe, before it flows through one of the exhaust gas post-treatment units, so that the exhaust gas already reaches the necessary activation temperature for the exhaust gas post-treatment unit, before flowing into the corresponding exhaust gas post-treatment agent unit.

Here the group 26 is connected to the switch 17, the group 25 to the switch 18, the group 24 to the switch 19, the group 23 to the switch 20 and the group 22 to the switch 21. The various groups 22 to 26 are therefore assigned to different supply banks.

This advantageous grouping of the consumers 3 to 12 in the control module 2 means that following deactivation of one of the groups 22 to 26 as a result of a malfunction of a consumer in the deactivated group, the main functions of the other groups are unaffected, thereby ensuring continuing availability of the sub-functions. Grouping the consumers 3 to 12 according to their functions therefore furthermore allows continuing operation of the exhaust gas post-treatment device in the event of a failure of one of the groups. One result of this, for example, is that at ambient temperatures in excess of the freezing point of the exhaust gas post-treatment agent, particle filter regeneration and the injection of exhaust gas post-treatment agent can take place, although secondary heating units are deactivated owing to a malfunction, for example. In this case it is still possible to comply fully with the statutory legislation.

Figure 2:
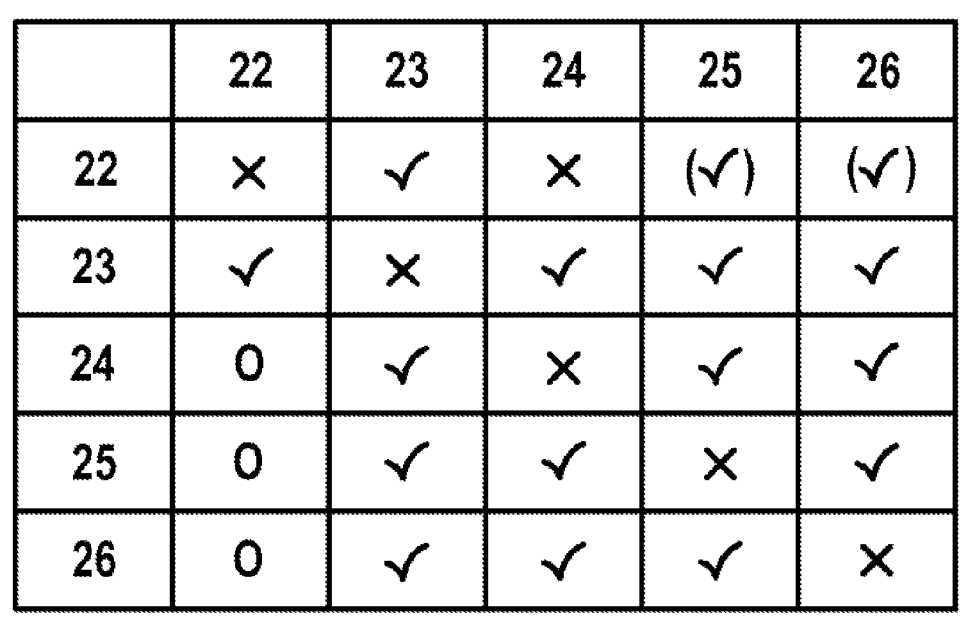

FIG. 2 in a so-called availability matrix shows the correlation between malfunctions of consumers and the effects of the respective malfunction on the other groups 22 to 26. The columns of the matrix relate to the malfunction in the various groups 22 to 26, whilst the resulting effects on the other groups 22 to 26 and on the overall system of the exhaust gas post-treatment device are represented in the rows. Here an "X" stands for "not possible", a check for "possible", a circle or "O" for "not relevant" and a check in brackets for "operationally limited".

If the group 22 is deactivated, for example, because the consumer 3 shows a malfunction, a metering of the exhaust gas post-treatment agent by means of the injection valve is not possible, whereas a simple particle filter regeneration can still be performed. The failure of the consumer 3 or of the injection valve here has no effect on the groups with regard to the build-up of pressure (group 24) or the primary and secondary heating units (groups 25 and 26).

If, on the other hand, the group 26 is deactivated by means of the switch 17 owing to a malfunction of one of the consumers 10 to 12, a metering or control of the injection valve for the exhaust gas post-treatment agent is still operationally possible to a limited extent, if the ambient temperatures exceed the freezing point of the exhaust gas post-treatment agent. Here the groups 23, 24 and 25 can still be operated. Other correlations will not be explained further at this point, since they are clearly apparent from FIG. 2.

What is claimed is:

1. An arrangement (1) for operating an exhaust gas post-treatment device of a motor vehicle, wherein the arrangement (1) comprises a plurality of consumers (3-12) and a control module (2), wherein the control module (2) comprises at least one switching unit (13) for switching the consumers (3-12) on and off, characterized in that the consumers (3-12) are switched by low-side switches (16) in order to fulfill their function and, grouped according to their function, are in each case connected to one safety switch (17-21), embodied as a high-side switch, of the switching unit (13).

2. The arrangement as claimed in claim 1, characterized by a diagnostic circuit for detecting a malfunction in the exhaust gas post-treatment device.

3. The arrangement as claimed in claim 2, characterized in that the diagnostic circuit is operatively connected to the switching unit (13), in such a way that by operating the corresponding safety switch (17-21) it deactivates a group (22-26) comprising the consumer (3-12), to which a detected malfunction is attributable.

4. The arrangement as claimed in claim 1, characterized in that a first group (22) of consumers (3) comprises at least one actuator for building up pressure for the exhaust gas post-treatment agent.

5. The arrangement as claimed in claim 4, characterized in that a second group (23) of consumers (4, 5) comprises at least one actuator for operating an injection valve for the exhaust gas post-treatment agent.

6. The arrangement as claimed in claim 5, characterized in that a third group (24) of consumers (6-8) comprises at least one actuator for a valve for controlling particle filter regeneration.

7. The arrangement as claimed in claim 6, characterized in that a fourth group (25) of consumers (9) comprises at least one primary heating unit.

8. The arrangement as claimed in claim 7, characterized in that a fifth group (26) of consumers (10, 12) comprises at least one secondary heating unit.

9. A method for operating an exhaust gas post-treatment device of a motor vehicle, wherein consumers of the exhaust gas post-treatment device are connected to a switching unit of a control module, characterized in that the consumers are switched by low-side switches in order to fulfill their function and, grouped according to their function, are in each case connected to one high-side switch serving as a safety switch of the switching unit.

10. The method as claimed in claim 9, characterized in that if a malfunction of one of the consumers is detected, a group comprising this consumer is deactivated through operation of the safety switch.

11. The arrangement as claimed in claim 1, characterized in that a group (23) of consumers (4, 5) comprises at least one actuator for operating an injection valve for the exhaust gas post-treatment agent.

12. The arrangement as claimed in claim 1, characterized in that a group (24) of consumers (6-8) comprises at least one actuator for a valve for controlling particle filter regeneration.

13. The arrangement as claimed in claim 1, characterized in that a group (25) of consumers (9) comprises at least one primary heating unit.

14. The arrangement as claimed in claim 1, characterized in that a group (26) of consumers (10, 12) comprises at least one secondary heating unit.

\* \* \* \* \*